United States Patent
Kundu et al.

(10) Patent No.: US 8,875,227 B2
(45) Date of Patent: *Oct. 28, 2014

(54) PRIVACY AWARE AUTHENTICATED MAP-REDUCE

(71) Applicant: International Business Machines Corporation, Armonk, NY (US)

(72) Inventors: Ashish Kundu, Elmsford, NY (US); Ajay Mohindra, Yorktown Heights, NY (US); Sambit Sahu, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/646,010

(22) Filed: Oct. 5, 2012

(65) Prior Publication Data

US 2014/0101714 A1 Apr. 10, 2014

(51) Int. Cl.
*G06F 17/00* (2006.01)

(52) U.S. Cl.
USPC ............... 726/1; 726/13; 707/822; 707/827; 709/203; 709/208; 709/223

(58) Field of Classification Search
CPC . H04L 63/20; H04L 2012/5636; H04L 63/12; G06F 21/64; G06F 21/00; G06F 17/30194; G06F 17/30206
USPC ................................. 726/1, 13; 707/822, 827
See application file for complete search history.

(56) References Cited

U.S. PATENT DOCUMENTS

| | | | | |
|---|---|---|---|---|
| 8,312,171 | B2 * | 11/2012 | B'Far et al. | 709/246 |
| 8,560,779 | B2 * | 10/2013 | Castillo et al. | 711/138 |
| 2008/0120314 | A1 * | 5/2008 | Yang et al. | 707/101 |
| 2010/0115046 | A1 * | 5/2010 | Reddy Byreddy et al. | 709/208 |
| 2010/0218037 | A1 * | 8/2010 | Swartz et al. | 714/6 |
| 2011/0208947 | A1 * | 8/2011 | Lin et al. | 712/28 |
| 2011/0296411 | A1 * | 12/2011 | Tang et al. | 718/1 |
| 2011/0313973 | A1 * | 12/2011 | Srivas et al. | 707/634 |
| 2012/0116782 | A1 * | 5/2012 | Punnoose et al. | 705/1.1 |
| 2013/0013675 | A1 * | 1/2013 | Lacapra et al. | 709/203 |
| 2013/0254255 | A1 * | 9/2013 | Nilsson et al. | 709/201 |
| 2013/0291118 | A1 * | 10/2013 | Li et al. | 726/26 |
| 2014/0101715 | A1 | 4/2014 | Kundu et al. | |

OTHER PUBLICATIONS

Ralf Lammel, 2007, Google's MapReduce programming model-Revisited, pp. 1-30.*

(Continued)

*Primary Examiner* — Farid Homayounmehr
*Assistant Examiner* — Lizbeth Torres-Diaz
(74) *Attorney, Agent, or Firm* — Yee & Associates, P.C.; Louis J. Percello (57) ABSTRACT

A computer-implemented process for privacy aware authenticated map-reduce processing receives data for a MapReduce operation to form received data, identifies a control point in a set of control points of the MapReduce operation to form an identified control point and identifies an applicable set of policies for the identified control point to form a selected set of policies. The selected set of policies is applied at the identified control point and responsive to a determination that application of the selected set of policies at the identified control point returned a positive result, the computer-implemented process continues operation to a next stage in the MapReduce operation.

8 Claims, 8 Drawing Sheets

(56) References Cited

OTHER PUBLICATIONS

Hung-chih Yang et al., 2007 Map-Reduce-Merge: Simplified Relational Data Processing on Large Clusters, pp. 1029-1040.*

Robert Johnson et al., 2002, Homomorphic Signatures Schemes, pp. 1-19.*

Wenchao Zhou et al. 2010, towards Secure Cloud Data Management, pp. 1-6.*

Wei et al., "SecureMR: A Service Integrity Assurance Framework for MapReduce", Proceedings of the ACSAC 2009 Computer Security Applications Conference, Dec. 2009, pp. 73-82.

Wang et al., "VIAF: Verification-based Integrity Assurance Framework for MapReduce", Proceedings of the 2011 IEEE 4th International Conference on Cloud Computing, Jul. 2011, pp. 300-307.

Xiao et al., "Accountable MapReduce in Cloud Computing", Proceedings of the 2011 IEEE Conference on Computer Communications Workshops, Apr. 2011, pp. 1082-1087.

Roy et al., "Airavat: Security and Privacy for MapReduce", Proceedings of the 7th USENIX Symposium on Networked Systems Design and Implementation, Apr. 2010, 16 pages.

Huang et al. "Towards Trusted Services: Result Verification Schemes for MapReduce", Proceedings of the 12th IEEE/ACM International Symposium on Cluster, Cloud and Grid Computing, May 2012, pp. 41-48.

Office Action regarding U.S. Appl. No. 13/669,170, dated Dec. 11, 2013, 24 pages.

Final Office Action regarding U.S. Appl. No. 13/669,170, dated May 7, 2014, 31 pages.

* cited by examiner

PRIVACY AWARE AUTHENTICATED MAP-REDUCE

BACKGROUND

1. Field

The disclosure relates generally to business analytics using a data processing system and more specifically to a framework for privacy aware authenticated map-reduce processing using the data processing system.

2. Description of the Related Art

MapReduce is a term used to describe a framework for processing a large volume of data, for example, crawled documents or web request logs, using a number of computers, often referred to as nodes or a collection forming a cluster. The nodes may reside on a same local network and use similar hardware or be shared across distributed systems using a variety of hardware. Processing of the large volume of data uses data stored either in a file system typically in the form of unstructured data or in a database wherein the data is accordingly structured. MapReduce typically hides the details associated with parallelism, data distribution, load balancing and fault tolerance and other administrative tasks from users.

MapReduce programming comprises a map step in which a master node splits the received input, into smaller segments, and distributes the split segments to mapper nodes. A mapper node may also split data in turn, creating a multi-level tree structure. Each mapper node processes the smaller problem, and passes the answer back to its master node. The mapper receives an input pair and produces a set of intermediate key/value pairs. All intermediate values associated with a same intermediate key are passed to a reducer in a reduce function.

A reduce step, or reduction phase, collects the intermediate results obtained by the mapper nodes and combines the results into a single output. The reduce function accepts the intermediate key and a set of values associated with key and merges the values to form a typically smaller set of values than the original set of values.

MapReduce accordingly enables distributed processing of the map and reduction operations. When each mapping operation is independent, all mappings can be performed in parallel subject to limitations of the data sources and the processing power available. In a similar manner, a set of reducers performs the reduction phase on a condition that all outputs of the map operation sharing a same key are made available to a same reducer at a same time.

Typically the MapReduce framework does not verify authenticity (integrity) of input data nor allow a consumer of output to verify authenticity of the data. In addition the MapReduce framework typically does not perform end-to-end privacy-preserving data authentication.

SUMMARY

According to one embodiment of the present invention, a computer-implemented process for privacy aware authenticated map-reduce processing receives data for a MapReduce operation to form received data, identifies a control point in a set of control points of the MapReduce operation to form an identified control point and identifies an applicable set of policies for the identified control point to form a selected set of policies. The selected set of policies is applied at the identified control point and responsive to a determination that application of the selected set of policies at the identified control point returned a positive result, the computer-implemented process continues operation to a next stage in the MapReduce operation.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, radio frequency (RF), etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
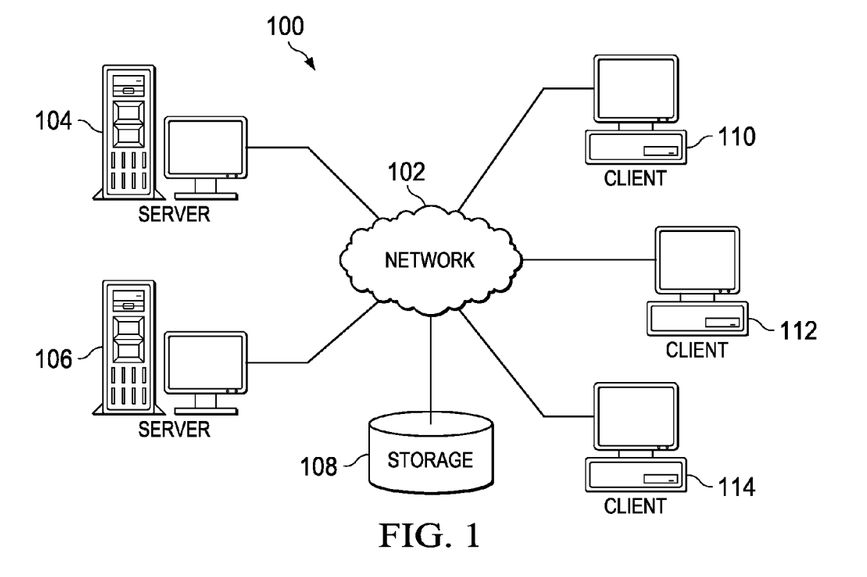
FIG. 1 is a block diagram of an exemplary network data processing system operable for various embodiments of the disclosure.
Figure 2:
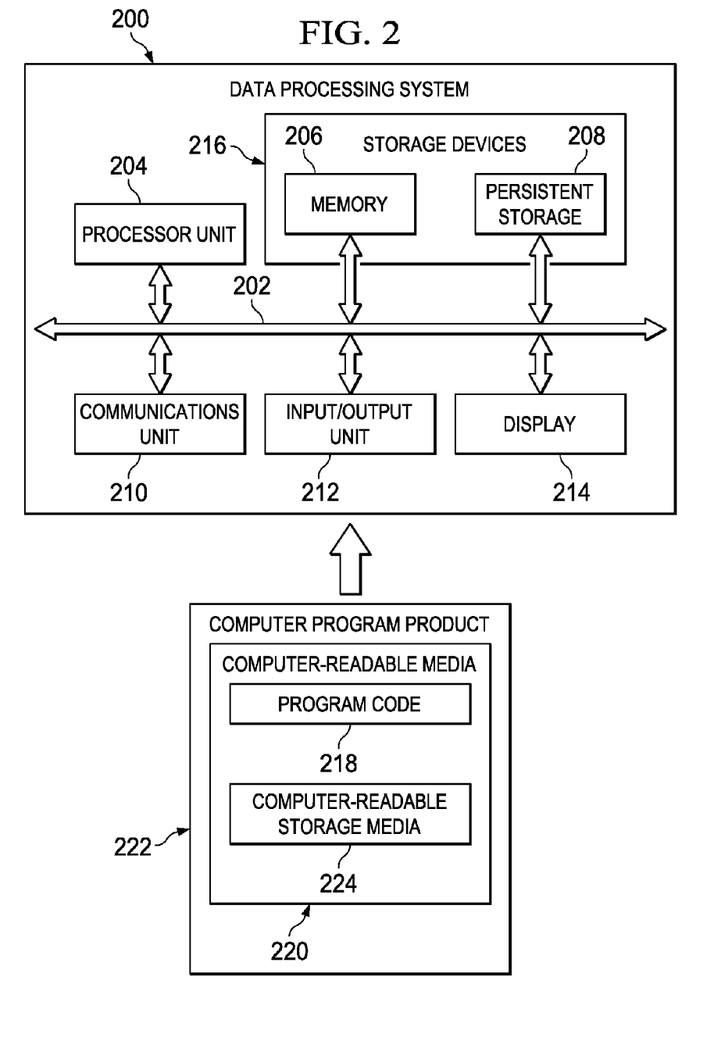
FIG. 2 is a block diagram of an exemplary data processing system operable for various embodiments of the disclosure.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

With reference to FIG. 2 a block diagram of an exemplary data processing system operable for various embodiments of the disclosure is presented. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instructions are in a functional form on persistent storage 208. These instructions may be loaded into memory 206 for execution by processor unit 204. The processes of the different embodiments may be performed by processor unit 204 using computer-implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable storage media, such as memory 206 or persistent storage 208.

Program code 218 is located in a functional form on computer readable storage media 220 that is selectively removable and may be loaded onto or transferred to data processing system 200 for execution by processor unit 204. Program code 218 and computer readable storage media 220 form computer program product 222 in these examples. In one example, computer readable storage media 220 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable storage media 220 also may take the form of a persistent storage, such as a hard drive, a thumb drive, or a flash memory that is connected to data processing system 200. The tangible form of computer readable storage media 220 is also referred to as computer recordable storage media. In some instances, computer readable storage media 220 may not be removable.

Alternatively, program code 218 may be transferred to data processing system 200 from computer readable storage media 220 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

In some illustrative embodiments, program code 218 may be downloaded over a network to persistent storage 208 from another device or data processing system for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

Using data processing system 200 of FIG. 2 as an example, a computer-implemented process for privacy aware authenticated map-reduce processing is presented. Processor unit 204 receives data for a MapReduce operation to form received data, identifies a control point in a set of control points of the MapReduce operation to form an identified control point and identifies an applicable set of policies for the identified control point to form a selected set of policies. Processor unit 204 applies the selected set of policies at the identified control point and responsive to a determination that application of the selected set of policies at the identified control point returned a positive result; processor unit 204 continues operation to a next stage in the MapReduce operation. Each stage (control point) in the MapReduce operation is therefore checked to ensure data integrity and privacy awareness is maintained throughout the operation.

Figure 3:
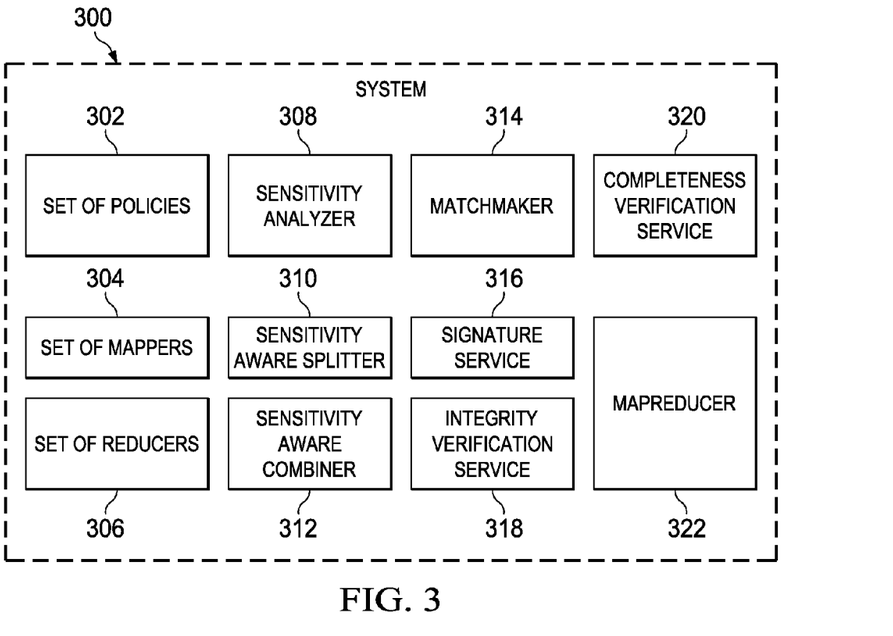
FIG. 3 is a block diagram representation of components of a privacy aware authenticated map-reduce system operable for various embodiments of the disclosure.

With reference to FIG. 3 a block diagram representation of components of a privacy aware authenticated map-reduce system operable for various embodiments of the disclosure is presented. System 300 is an example embodiment of a privacy aware authenticated map-reduce system of the disclosure. System 300 leverages other components of an underlying system such as server 104 or client 110 of network data processing system 100 of FIG. 1 or data processing system 200 of FIG. 2.

System 300 comprises a number of functional elements including set of policies 302, set of mappers 304, set of reducers 306, sensitivity analyzer 308, sensitivity aware splitter 310, sensitivity aware combiner 312, matchmaker 314, signature service 316, integrity verification service 318, completeness verification service 320 and MapReduce 322. The functional elements may be presented as separate entities depicted or as a combination of elements comprising a set of components or a monolithic structure without loss of functionality.

Set of policies 302 provides a capability in the form of a set of rules or other mechanism of conditional processing to direct operation of the system. Application of one or more policies at strategic locations within a process of MapReduce controls input and output of a respective location. A selection of policies is applied at each control point within the stages of a MapReduce operation. For example, the set of policies comprise policies specific to a trust policy for mappers, a trust policy for reducers, and a privacy/confidentiality policy applicable to both inputs and outputs directed toward maintaining sensitivity of data. Each policy mentioned comprises one or more policy directive, statement or rule to enable usage within the overall MapReduce operation.

Set of mappers 304 provides a capability of processing an identified segment of the large volume of data to be processed within the MapReduce operation. Each mapper is assigned a portion of the large volume of data wherein the data is typically associated with a key to identify data processed using a specific mapper in the set of mappers. Each mapper verifies input and signs output using the system disclosed.

Set of reducers 306 provides a capability of collecting the intermediate results obtained by processing of set of mappers 304 and combines the results into a single output. The reduce function of set of reducers 306 accepts an intermediate key and a set of values associated with key from each mapper in set of mappers 304 and merges the values to form a typically smaller set of values than existed in the original set of values.

Sensitivity analyzer 308 provides a capability of recognizing data attributes associated with sensitivity as defined by a data owner. For example, a set of data may be tagged as not sensitive and accordingly available for general use. In another example, a set of data may be tagged as sensitive and accordingly restricted use. Sensitive data may thus be tagged to indicate levels of sensitivity as well, including properties of read only, and update according to a rule or specific user attribute.

Sensitivity aware splitter 310 provides a capability to subset incoming data into predetermined units suitable for processing by designated mappers. For example, data received may be split according to a separation of sensitive and non-sensitive data using the sensitivity analysis provided by sensitivity analyzer 308.

Sensitivity aware combiner 312 provides a capability, which is the opposite of sensitivity aware splitter 310, to combine data provided by each mapper in set of mappers 304, and takes the process results of the previously split data and merges the results. The merging occurs according to a prescribed sensitivity of the data. For example, all sensitive data of a specific sensitivity may be combined, but data having different sensitivities cannot be combined nor can sensitive data be combined with non-sensitive data (without specific authorization).

Matchmaker 314 provides a capability in one instance to match a sensitivity of data with a trust of mappers, for input processing and in a corresponding manner match a sensitivity of data with a trust of reducers for output processing. A matchmaker capable of both operations may be used or a specific matchmaker for each task may also be used. The matchmaking ensures a mapper (or reducer) is selected for processing a specific type of data, with respect to sensitivity, according to the capabilities of the mapper (or reducer).

Signature service 316 provides a capability for signing data and for signature redaction to ensure authenticity of the data being processed. Signature redaction removes portions of the previously created signature to further prevent misuse of sensitive data. Conventional signing processes may be called, as needed using the service. Signature service 316 may be called for each segment of data processed as a result of a splitting operation. For example a redacted signature may be used for a mapper to avoid providing a complete signature to the mapper.

Integrity verification service 318 determines whether the data content has leaked out and therefore data is missing. For example, a malicious node may have compromised the data by removing portions of the data, injecting portions of data into the data or otherwise causing the data to be other than expected or original.

Completeness verification service 320 provides a capability of ensuring the data used is complete, wherein complete means no data is missing. For example, while a signature may be used to determine authenticity of the data the signature does not indicate completeness. A checksum may be used to determine whether the data received is original.

MapReduce 322 provides a capability of processing data using the operational characteristics of MapReduce programming as is currently available. The previously described components of system 300 comprise additional services to augment the conventional MapReduce programming.

Figure 4:
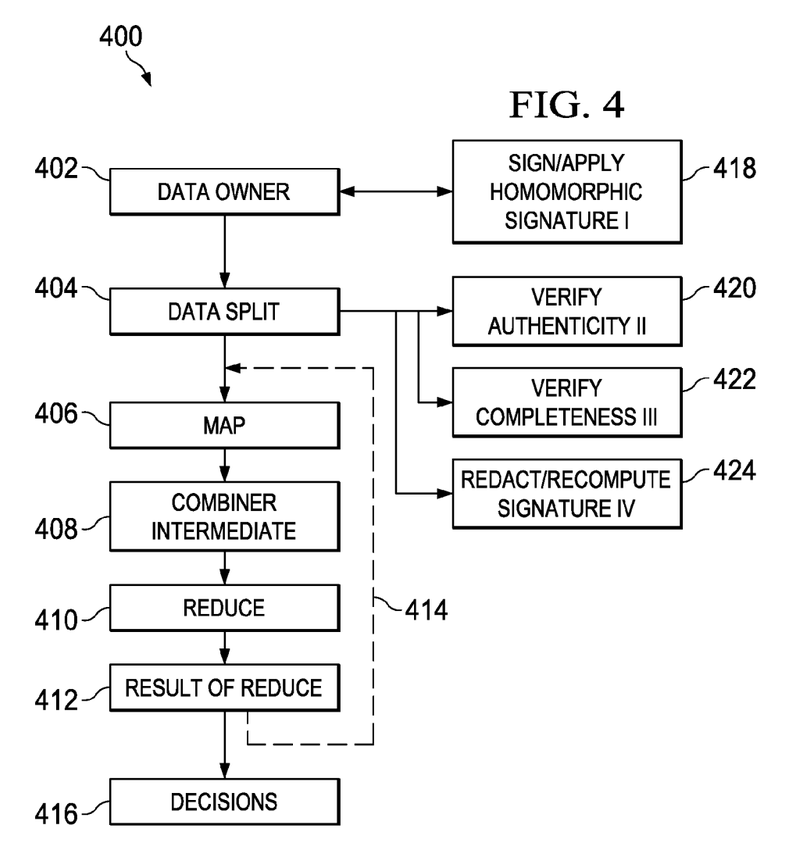
FIG. 4 is a block diagram of a data integrity solution using the system of FIG. 3 in accordance with one embodiment of the disclosure.

With reference to FIG. 4 a block diagram of a data integrity solution using the system of FIG. 3 in accordance with one embodiment of the disclosure is presented. Data integrity solution 400 is an example of an embodiment of system 300 of FIG. 3 providing one particular aspect of the capability offered by system 300 of FIG. 3.

A set of services is defined for use with MapReduce operation when using system 300 of FIG. 3 as sign/apply homomorphic signature I 418, verify authenticity II 420, verify completeness III 422 and redact/re-compute signature IV 424.

Elements of data owner 402 through reduce 412 represent various stages of a MapReduce operation when using system 300 of FIG. 3 to achieve decisions 416 as an end result. Data owner 402 represents a data owner using a service of sign/apply homomorphic signature I 418 to apply a signature to data of the owner used within the MapReduce process. Use of homomorphic encryption enables needed calculations to be performed on the data, whether the data is encrypted. For example, redacting a portion of the signature. Sign/apply homomorphic signature I 418 represents a set of services provided in support of the privacy aware authenticated MapReduce operation. Signing is carried out at very stage where either new data or split data is generated. Therefore usage of signing services is available to and used by end portions of each operation at data owner 402, data split 404, map 406, combiner intermediate 408, reduce 410 and result of reduce 412 to sign the data generated.

Data split 404 represents the segmenting of the input data provided by data owner 402, using verify authenticity II 420. Data split 404 further uses services in the form of verify completeness III 422 to ensure the data consumed is complete. Each split portion of data is assigned a signature using services provided by redact/re-compute signature IV 424.

Map 406, combiner intermediate 408, reduce 410 and result of reduce 412 are further examples of stages within the sequence of a MapReduce operation. A link 414 represents a need to perform further processing to achieve a desired result. Link 414 loops back to data split 404 for further segmenting when needed. At each stage in the operation a selected set of services is used in accordance with a predetermined requirement of the stage. For example, map 406 requires use of the services of verify authenticity II 420, and verify completeness III 422 during processing. The services of sign/apply homomorphic signature I 418 are used to create the output passed to a next stage of combiner intermediate 408.

In a similar manner to that used with map 406, the stages of combiner intermediate 408 and reduce 410 use the services of verify authenticity II 420, and verify completeness III 422 during processing. The services of sign/apply homomorphic signature I 418 are used to create output passed to a next stage of result of reduce 412.

The stage of result of reduce 412 uses the same set of services as described for the stages of combiner intermediate 408 and reduce 410. However the stage of decisions 416 does not require use of all services previously described. The stage of decisions 416 requires and uses only the two services of verify authenticity II 420, and verify completeness III 422. Decisions 416 does not require the services of sign/apply homomorphic signature I 418 or redact/re-compute signature IV 424 as used previously by the stage of data split 404. Verification is accordingly performed at every stage where data is received. Therefore verification is performed at the beginning portion of operational stages of data split 404, map 406, combiner intermediate 408, reduce 410 and result of reduce 412 to verify data received.

Figure 5:
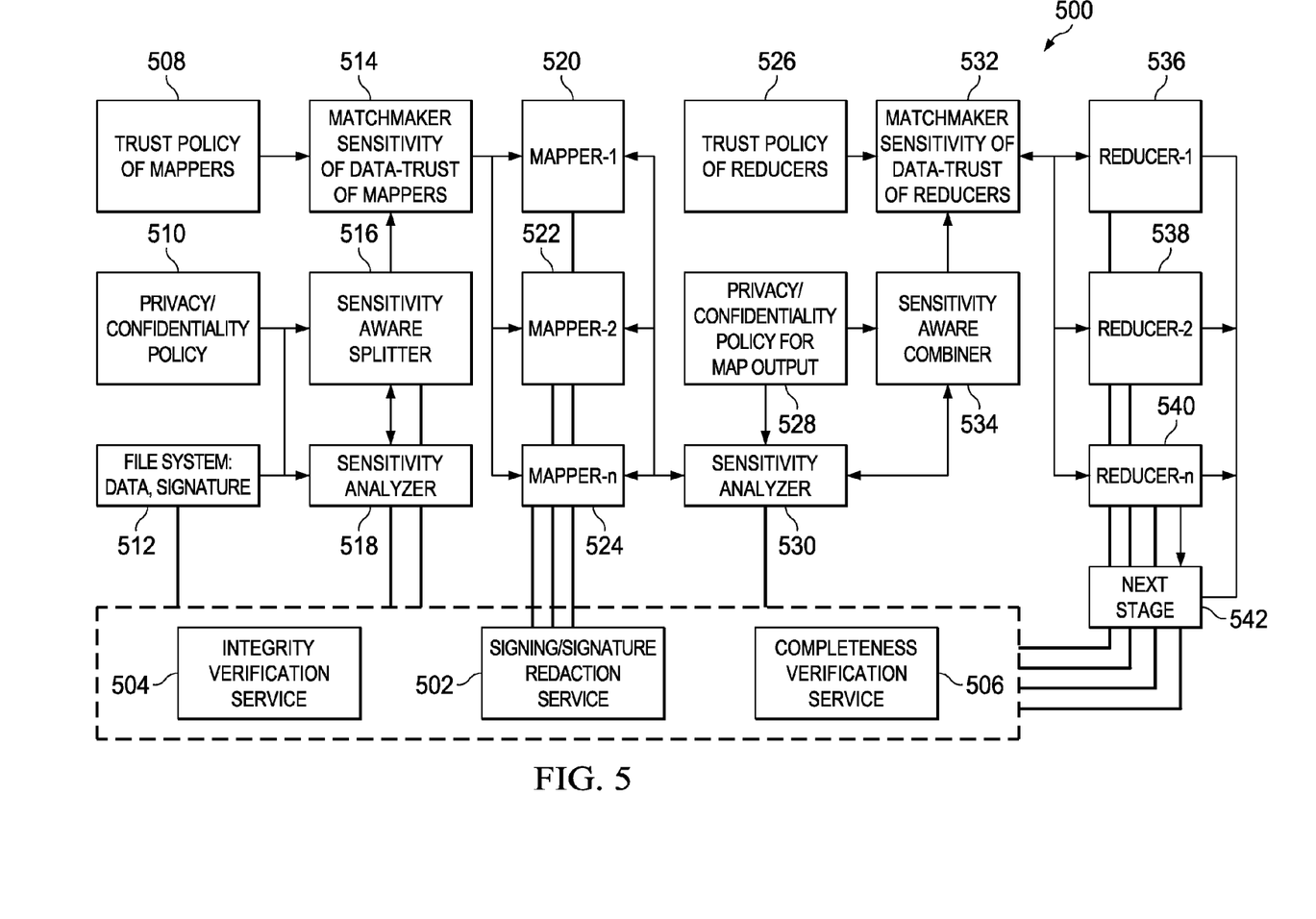
FIG. 5 is a block diagram of a privacy aware data integrity solution using the system of FIG. 3 in accordance with one embodiment of the disclosure.

With reference to FIG. 5 a block diagram of privacy aware data integrity solution using the system of FIG. 3 in accordance with one embodiment of the disclosure is presented. The privacy aware data integrity solution is a further example of using the system of FIG. 3. The example of privacy aware data integrity solution 500 depicts a portion of a MapReduce operation representative of a stage. Arcs are used to indicate usage of the set of services defined as signing/signature redaction service 502, integrity verification service 504 and completeness verification service 506. The set of services just described represent a version of services of sign/apply homomorphic signature I 418, verify authenticity II 420, verify completeness III 422 and redact/re-compute signature IV 424, all of FIG. 4.

On input file system: data, signature 512 provides the data input used in the MapReduce process including a signature to sensitivity analyzer 518 to determine data characteristics according to sensitivity. File system: data, signature 512 uses services of signing/signature redaction service 502. Privacy/confidentiality policy 510 provides policy information used by sensitivity analyzer 518 to determine characteristics of the input data. Privacy/confidentiality policy 510 information includes descriptions of how to process respective input data in accordance with levels of sensitivity associated with the data. Sensitivity analyzer 518 uses the verification services of integrity verification service 504 and completeness verification service 506.

Trust policy of mappers 508 is a set of policies defining characteristics of a respective mapper used by matchmaker sensitivity of data—trust of mappers 514 to determine assignment of data to a respective mapper in a set of mappers for processing. Matchmaker sensitivity of data—trust of mappers 514 assigns data for processing received from sensitivity aware splitter 516 to one or more of mapper-1 520, mapper-2 522, through mapper-n 524. Sensitivity aware splitter 516 provides a capability of segmenting the data received according to prescribed splitting in a context of sensitivity of the data. Sensitivity aware splitter 516 uses services of signing/signature redaction service 502 to sign chunks of data as well as the verification services of integrity verification service 504 and completeness verification service 506.

Having described the input side a corresponding set of function and relationships exist for the output side to ensure data integrity and privacy awareness.

Sensitivity analyzer 530 uses the verification services of integrity verification service 504 and completeness verification service 506 to process the output of the one or more of mapper-1 520, mapper-2 522, through mapper-n 524. Sensitivity analyzer 530 verifies the output conforms to data integrity and privacy awareness required before processing using information received from privacy/confidentiality policy 528 to determine characteristics of the input data received from the map process.

Trust policy of reducers 526 is a set of policies defining characteristics of a respective reducer used by matchmaker sensitivity of data—trust of reducer 532 to determine assignment of data to a respective reducer in a set of reducer for processing. Matchmaker sensitivity of data—trust of reducers 532 assigns data for processing received from sensitivity aware combiner 534 to one or more of reducer-1 536, reducer-2 538, through reducer-n 540. Sensitivity aware combiner 534 provides a capability of combining or merging of the data received according to prescribed merging in a context of the sensitivity of the data. Sensitivity aware combiner 534 uses services of signing/signature redaction service 502 to sign merged data as well as the verification services of integrity verification service 504 and completeness verification service 506.

Data which has been processed though the described elements of input and out arrives at next stage 542 (which is any of the stages in a sequence of stages of the example and not a named stage) where the data is again verified using the services of signing/signature redaction service 502, integrity verification service 504 and completeness verification service 506. The sequence of operations is repeated at each stage in sequence as the data progresses though the sequence of operations comprising the MapReduce process. Each stage represents a point at which data is checked to maintain data integrity and use privacy aware processing.

Figure 6:
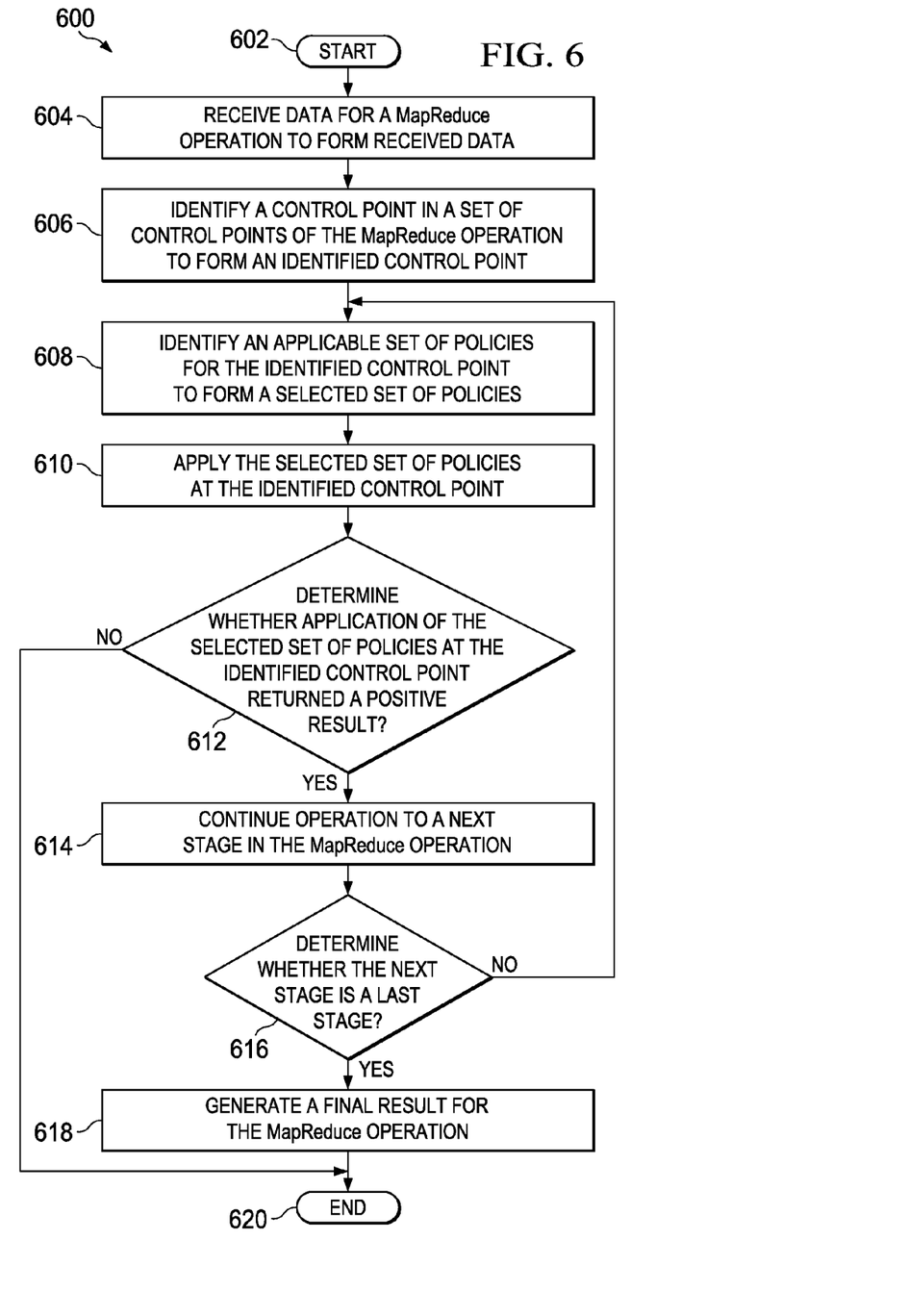
FIG. 6 is a flowchart of a process of a privacy aware data integrity solution using the system of FIG. 3 in accordance with one embodiment of the disclosure.

With reference to FIG. 6 a flowchart of a process of a privacy aware data integrity solution using the system of FIG. 3 in accordance with one embodiment of the disclosure is presented. Process 600 is an example of a process using system 300 of FIG. 3.

Process 600 begins (step 602) and receives data for a MapReduce operation (step 604). Process 600 identifies a control point in a set of control points of the MapReduce operation to form an identified control point (step 606). As previously stated with respect to the description of FIG. 4 process 600 selects different services for performing data integrity checking and privacy awareness according to which stage or control point in a sequence of stages. For example, in data splitting stage or control point redact/re-compute signature service IV 424 of FIG. 4 is used but in a next stage the service is not.

Process 600 identifies an applicable set of policies for the identified control point to form a selected set of policies (step 608). The selected set of policies may be specific to a control point or a portion of policies available throughout the MapReduce operation.

Process 600 applies the selected set of policies at the identified control point (step 610). Process 600 determines whether application of the selected set of policies at the identified control point returned a positive result (step 612). A positive result implies all compliance requirements are met according to the selected set of policies. A negative result implies a failure of compliance is detected which could lead to data integrity or privacy issues. Responsive to a determination application of the selected set of policies at the identified control point returned a negative result process 600 skips ahead to terminate (step 620) Termination in this case includes information related to the cause of the failure as available, including which stage or control point encountered a failure and as well as identifying an element of the processing operation and type of failure (data integrity or privacy issue).

Responsive to a determination application of the selected set of policies at the identified control point returned a positive result, process 600 continues operation to a next stage in the MapReduce operation (step 614). Process 600 determines whether the next stage is a last stage (step 616). Responsive to a determination the next stage is not a last stage, process 600 returns to step 608 as before. Responsive to a determination the next stage is a last stage, process 600 generates a final result for the MapReduce operation (step 618) and terminates thereafter (step 620).

Process 600 therefore applies a selected set of policies at each stage entry and exit throughout the MapReduce operation to ensure data integrity is maintained as well as privacy awareness. In event of a failure the point of failure is known and corrective action can be taken.

Figure 7:
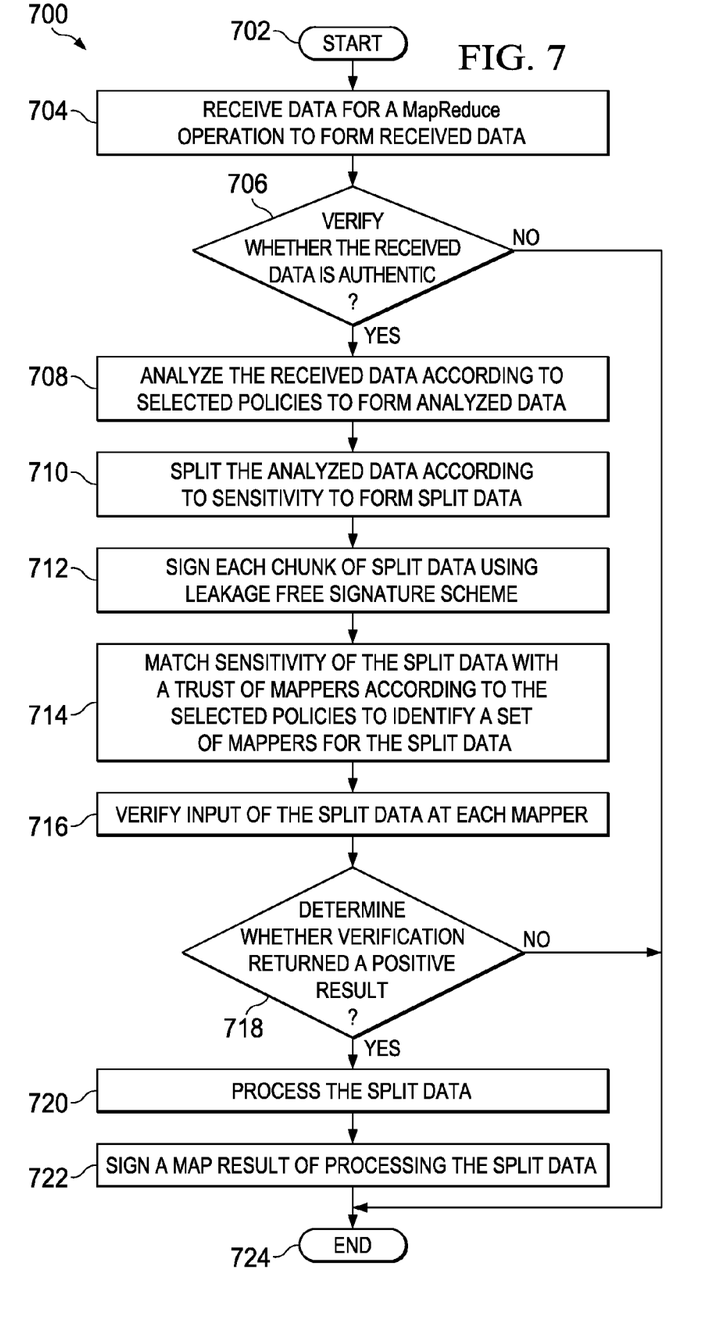
FIG. 7 is a flowchart of a process of a map operation portion of a privacy aware data integrity solution using the system of FIG. 3 in accordance with one embodiment of the disclosure.

With reference to FIG. 7 a flowchart of a process of a map operation portion of a privacy aware data integrity solution using the system of FIG. 3 in accordance with one embodiment of the disclosure is presented. Process 700 is an example of a process using a map portion of system 300 of FIG. 3. The example represents a portion of the MapReduce operation dealing with a map operation for data received as input to create an intermediate output. A corresponding process takes the data processed in the map operation in the form of an intermediate result and reduces the intermediate data to form a final output.

Process 700 begins (step 702) and receives data for a MapReduce operation to form received data (step 704). Process 700 verifies whether the received data is authentic (step 706). The data received is authenticated meaning that the data is signed and a signature is verified as valid. Responsive to a determination that the received data is not signed or otherwise not authenticated, process 700 skips to terminate (step 724). Termination includes an error report.

Responsive to a determination that the received data is signed and authenticated, process 700 analyzes the received data according to selected policies to form analyzed data (step 708). The selected predetermined policies specify data integrity and privacy aware considerations in effect and accordingly require conformance to ensure the MapReduce operation is in compliance.

Process 700 splits the analyzed data according to sensitivity, associated with the received data, to form split data (step 710). The sensitivity implies a coarse split between sensitive and non-sensitive data but may also require levels of sensitivity to be used to enable a down stream mapper appropriate for a level of sensitivity to be selected.

Process 700 signs each chunk of split data using a leakage free signature scheme (step 712). Signing each chunk enables assurance that a receiving process can use the data with knowledge the data is correct. The leakage free signature scheme ensures the signature has not been tampered with during the signing operation.

Process 700 matches a sensitivity of the split data with a trust of mappers according to the selected set of policies to identify a set of mappers for the analyzed data (step 714). A mapper is selected to process the split data according to a capability of the mapper for handling the split data. For example, sensitive data is assigned to a mapper having a capability to process sensitive data and would therefore not be assigned to a mapper that processes non-sensitive data.

Process 700 verifies input of the split data at each mapper (step 716). Again, each step of the operation requires checking of data used to ensure integrity and privacy awareness at each processing domain or boundary. Process 700 determines whether verification returned a positive result (step 718). Responsive to a determination that the verification did not return a positive result, process 700 skips to terminate (step 724). Error information regarding the failed verification is provided. Responsive to a determination that the verification returned a positive result, process 700 processes the split data (step 720). Processing occurs in one or more of the assigned mappers using parallel processing of each split data portion.

Process 700 signs a map result of processing the split data (step 722) and terminates thereafter. The result of map processing is an intermediate result, which is used as input to a next stage in the MapReduce operation employing reducers to merge the map results. Each map result is signed to ensure data integrity and privacy awareness at a subsequent stage in the operation.

Figure 8:
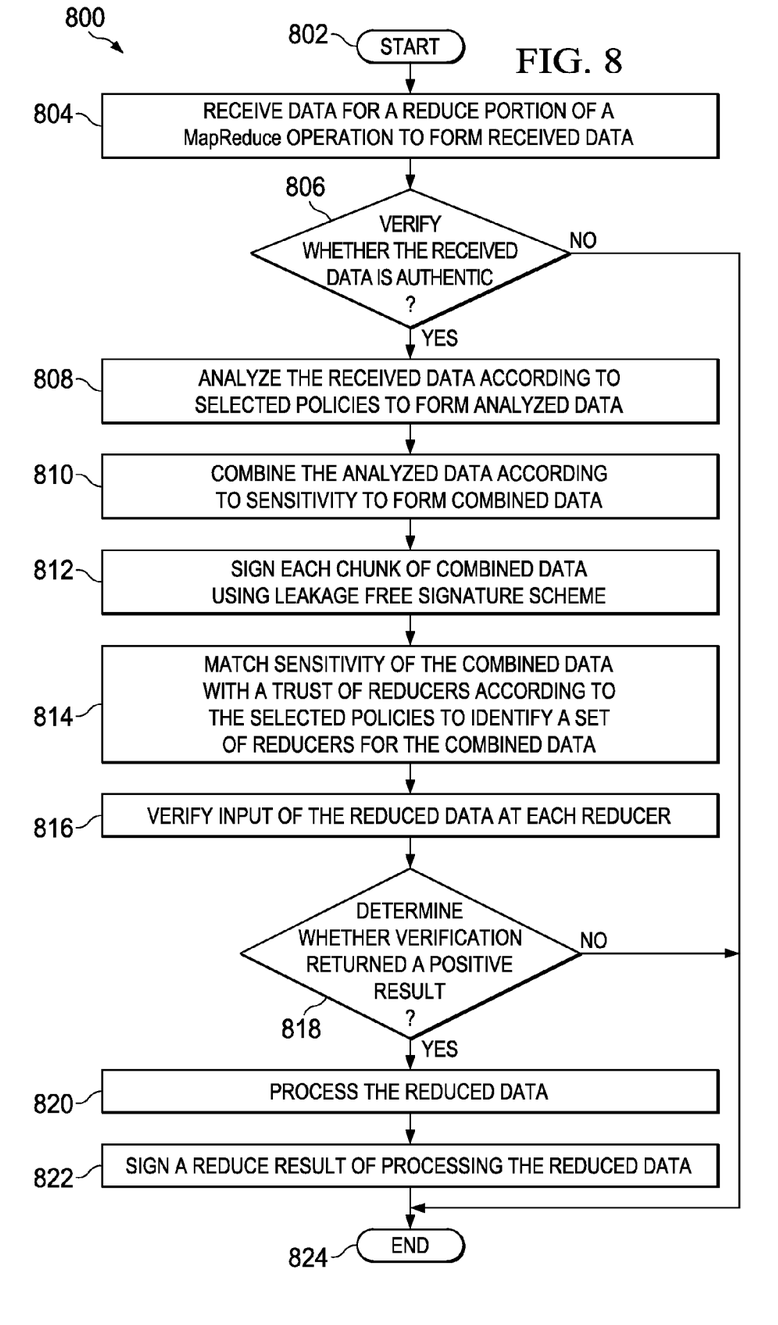
FIG. 8 is a flowchart of a process of a reduce operation portion of a privacy aware data integrity solution using the system of FIG. 3 in accordance with one embodiment of the disclosure.

With reference to FIG. 8 a flowchart of a process of a reduce operation portion of a privacy aware data integrity solution using the system of FIG. 3 in accordance with one embodiment of the disclosure is presented. Process 800 is an example of a process using a reduce portion of system 300 of FIG. 3. The example represents a portion of the MapReduce operation dealing with a reduce operation for data received as input from the intermediate output of the map portion of the MapReduce operation of process 700 of FIG. 7. The process takes the data processed in the corresponding map operation in the form of an intermediate result of the MapReduce operation and reduces the intermediate data to form a final output.

Process 800 begins (step 802) and receives data for a reduce portion of a MapReduce operation to form received data (step 804). Process 800 verifies whether the received data is authentic (step 806). The data received is authenticated meaning that the data is signed and a signature is verified as valid. Responsive to a determination that the received data is not signed or otherwise not authenticated, process 800 skips to terminate (step 824). Termination typically includes an error report.

Responsive to a determination that the received data is signed and authenticated, process 800 analyzes the received data according to selected policies to form analyzed data (step 808). The selected predetermined policies specify data integrity and privacy aware considerations in effect and accordingly require conformance to ensure the reduce portion of the MapReduce operation is in compliance.

Process 800 combines (including a merge operation) the analyzed data according to sensitivity of the respective data to form combined data (step 810). The sensitivity typically implies a coarse split between sensitive data and non-sensitive data but may also require levels of sensitivity within each type to be used to enable a down stream reducer appropriate for a level of sensitivity to be selected.

Process 800 signs each chunk of combined data using a leakage free signature scheme (step 812). Signing each chunk enables assurance that a receiving down stream process can use the data with knowledge the data is correct as in a not altered form or original content from a sending operation. The leakage free signature scheme ensures the signature has not been tampered with during the signing operation.

Process 800 matches a sensitivity of the combined data with a trust of reducers according to the selected set of policies to identify a set of reducers for the combined data (step 814). A reducer is selected to process the combined data according to a capability of the reducer for handling the combined data. For example, sensitive data is assigned to a reducer having a capability to process sensitive data and would therefore not be assigned to a reducer that processes non-sensitive data. In a similar manner sensitive data of a particular sensitivity is assigned to a reducer having a capability to process sensitive data at that sensitivity or a higher level of sensitivity and would therefore not be assigned to a reducer that processes a lower level of sensitive data.

Process 800 verifies input of the reduced data at each reducer (step 816). Again, each step of the operation requires checking of data used to ensure integrity and privacy awareness at each processing domain or boundary. Process 800 determines whether verification returned a positive result (step 818). Responsive to a determination that the verification did not return a positive result, process 800 skips to terminate (step 824). Error information regarding the failed verification is typically provided. Responsive to a determination that the verification returned a positive result, process 800 processes the reduced data (step 820). Processing occurs in one or more of the assigned reducers using parallel processing of each combined data portion.

Process 800 signs a reduced result of processing the combined data (step 822) and terminates thereafter (step 824) as before. The result of reduce processing is a completion of processing of the intermediate result of the map processing operations. The received input from the map stage is used in the reduce stage (the next stage) of the MapReduce operation employing reducers to merge the map-generated results. Each map result is accordingly signed to ensure data integrity and privacy awareness at a subsequent stage in the operation.

Thus, illustrative embodiments of the present invention provide a computer implemented method, computer system, and computer program product for privacy aware authenticated map-reduce processing receives data for a MapReduce operation to form received data, identifies a control point in a set of control points of the MapReduce operation to form an identified control point and identifies an applicable set of policies for the identified control point to form a selected set of policies. The selected set of policies is applied at the identified control point and responsive to a determination that application of the selected set of policies at the identified control point returned a positive result; the computer-implemented process continues operation to a next stage in the MapReduce operation.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented process for privacy aware authenticated map-reduce processing, the computer-implemented process comprising:
a processor unit receiving data for a MapReduce operation to form received data;
determining, by the processor unit, the received data is signed using at least one of a set of services including a signing/signature redaction service, an integrity verification service and a completeness verification service, wherein a signature associated with the received data is a homomorphic signature;
identifying, by the processor unit, a control point in a set of control points of the MapReduce operation to form an identified control point wherein the control point is a stage in a sequence of stages comprising the MapReduce operation;
identifying, by the processor unit, an applicable set of policies for the identified control point to form a selected set of policies wherein the selected set of policies include privacy information and sensitivity information including levels of sensitivity associated with the received data;
applying, by the processor unit, the selected set of policies at the identified control point;
determining, by the processor unit, whether application of the selected set of policies at the identified control point returned a positive result; and
responsive to a determination, by the processor unit, that application of the selected set of policies at the identified control point returned a positive result, continuing, by the processor unit, operation to a next stage in the MapReduce operation.

2. The computer-implemented process of claim 1 further comprising:
determining, by the processor unit, whether the next stage is a last stage; and
responsive to a determination that the next stage is a last stage, generating, by the processor unit, a final result for the MapReduce operation.

3. The computer-implemented process of claim 1 wherein identifying, by the processor unit, an applicable set of policies for the identified control point to form a selected set of policies further comprises:
selecting, by the processor unit, a policy from a set of policies comprising a trust policy of mappers, a privacy/confidentiality policy, a trust policy of reducers, and a privacy/confidentiality policy for map output.

4. The computer-implemented process of claim 1 wherein applying, by the processor unit, the selected set of policies at the identified control point further comprises:
using one or more of the selected set of policies by one or more of a sensitivity analyzer, a sensitivity aware splitter and a matchmaker sensitivity of data-trust of mappers, a sensitivity aware combiner and a matchmaker sensitivity of data-trust of reducers.

5. The computer-implemented process of claim 1 wherein the applying, by the processor unit, the selected set of policies at the identified control point further comprises:
verifying, by the processor unit using a signature service whether the received data is signed;
analyzing, by the processor unit using a sensitivity analyzer, the received data according to the selected policies to form analyzed data;
splitting the analyzed data, by the processor unit using a sensitivity aware splitter according to sensitivity to form split data;
signing, by the processor unit using the signature service each chunk of split data;
matching sensitivity of the split data with a trust of mappers by the processor unit using a matchmaker according to the selected policies to identify a set of mappers for the analyzed data;
verifying, by the processor unit using an integrity verification service and a completeness verification service input in the split data;
determining, by the processor unit, whether verification of input in the split data returned a positive result;
responsive to a determination that verification returned a positive result, processing the split data, by the processor unit; and
signing a map result of processing the split data, by the processor unit using the signature service.

6. The computer-implemented process of claim 5 further comprising:

receiving by the processor unit the map result of processing the split data for a reduce portion of a MapReduce operation to form received map result data;

verifying by the processor unit using the signature service whether the received map result data is authentic, wherein authenticated meaning that the map result data is signed and a signature is verified as valid; and responsive to a determination that the received map result data is signed and authenticated, analyzing the received map result data by the processor unit according to selected policies to form analyzed data, wherein the selected policies specify data integrity and privacy aware considerations in effect and accordingly require conformance to ensure a reduce portion of the MapReduce operation is in compliance.

7. The computer-implemented process of claim 6 wherein analyzing the received map result data according to the selected policies to form analyzed data further comprises:

analyzing the received map result data by the processor unit according to sensitivity of respective data to form combined data, wherein the sensitivity implies a coarse split between sensitive data and non-sensitive data and levels of sensitivity within each of the sensitive data and the non-sensitive data to enable a down stream reducer appropriate for a level of sensitivity to be selected by the processor unit.

8. The computer-implemented process of claim 7 wherein analyze the received map result data according to sensitivity of respective data to form combined data further comprises:

signing each chunk of combined data by the processor unit using a leakage free signature; and matching a sensitivity of the combined data with a trust of reducers by the processor unit according to the selected set of policies to identify a set of reducers for the combined data, wherein a reducer is selected by the processor unit to process the combined data according to a capability of the reducer for handling the combined data.

* * * * *